Patented Dec. 3, 1935

2,023,204

UNITED STATES PATENT OFFICE 2,023,204

HEAT INSULATION

Carl Georg Munters and John Gudbrand Tandberg, Stockholm, Sweden; said Tandberg assignor to said Munters No Drawing. Application August 20, 1932, Serial No. 629,741. In Sweden August 21, 1931

12 Claims. (Cl. 154—45)

The present invention relates to heat insulation and more particularly to insulation consisting of a cellular mass of one or more organic substances.

In the art as hitherto developed heat insulations of the above kind have been produced from a mass of asphalt which is melted in an airtight container into which a gas soluble in the mass is fed under pressure. When the mass has been saturated with the gas, the external pressure is suddenly reduced with the result that gas bubbles or cells are formed in the mass, making it highly vesiculated.

The present invention makes use of this known process and has for its object to provide a heat insulation material with a very high porosity, which has a very low specific gravity, and which is of solid elastic form at ordinary temperatures. According to the invention, organic substances are used which are converted into liquid state at a temperature, of about 100–300° C. but which, when again cooled down to usual temperatures, become solid or hard, and at this temperature are not softened, for instance, by moisture. We have found that polystyrol, i. e. compounds belonging to the group of polymeric compounds of vinyl, such as the substance commercially known as trolitul, and equivalents thereof, provide an excellent insulation material when treated as herinafter explained. The substance or combinations thereof from which the insulation material is built up will, in the following description, be termed the base substance.

According to the invention, insulating material may be produced with one or more base substances as the principal constituent, and such material is cellular or porous to a high degree and, therefore contains a very small quantity of base substance per unit volume. A unit of the material contains a great number of cells, most of which are closed, said cells being separated from each other by walls of the base substance. Said walls are of very small thickness which may be as low as between 0.1 and 0.001 mm. Consequently the cell walls have such a small cross section that there is a very great resistance to heat conduction through the same, which resistance is increased still more due to the fact that the mentioned base substances are themselves bad heat conductors.

On account of the above mentioned quality of the material, that is its very high porosity and the extremely thin cell walls, its specific gravity will be very low. Tests carried out have shown that the specific gravity may be decreased without difficulty to below 0.1, and if desired, even as far as below 0.04. This quality characterizing the material is of great importance, with reference to its heat insulating capacity, in cases where the finished material is to be used for insulating portable apparatus, such as, for instance, thermos bottles, heat retaining containers, refrigerators or the like. In spite of its low specific gravity the insulating material is very permanent (stable), i. e. it will not be compressed and lose its porosity even at rather high temperatures, which may occur, for instance, in the walls of heat retaining containers.

As an example, the treatment of trolitul according to the invention will be described in the following:

The base substance, which is suitably in pulverized form, is heated to the melting point, that is about 170° C., in a closed vessel containing a gas, preferably methyl chloride, which is soluble in the substance. The pressure in the vessel may be about 30 atmospheres. The melted or semi-liquefied mass is thereafter submitted to a quick expansion, the pressure prevailing in the melting vessel being rapidly reduced. The expansion may be produced for instance, by opening a bottom valve or the like in the expansion vessel and by allowing the mass to be forced either into the atmosphere or into a vacuum vessel or one in which a lower pressure is prevailing than in the melting vessel. The time required for reducing the pressure in the mass may be made regulatable. The pressure reduction may be utilized for forcing the mass from the melting vessel to the other vessel. The vessel into which the mass is forced under pressure reduction after the melting procedure, may be formed according to the form or shape desired of the insulating material. Instead of forming the material in this manner, the cellular or porous mass leaving the vessel in which melting occurs may be cut into small pieces, which thereafter may be pressed together or connected in any known manner to secure any desired shape.

The gas dissolved in the base substance during the melting period is freed during the expansion period and forms a great number of fine bubbles or cells in the base substance, which consequently is given the above described very high degree of porosity. A cover for protecting the inner part of the porous mass may preferably be obtained by heating and melting its outer parts.

If desired, solid substances may be introduced into the melted mass before its expansion, as for instance saw dust, wood fibre, textile fibre, aluminium powder or the like. Fibre substances give great stiffness to the material, and therefore this method is preferable, for instance, when large plates of relatively small thickness are to be produced. By incorporating aluminum powder, a reflecting surface may be obtained on the cell walls in order to decrease the heat radiation through the cells. For obtaining this effect, it is advisable to choose an aluminum powder, the grains of which have a predominantly flat form. Also other metals than aluminum, such as cadmium, silver, bronze and others may be used. The desired increase in stiffness of the material, for instance for producing thin insulating plates, may also be obtained by mixing paper waste, threads of cotton, wool or the like, into the mass.

Other gases than methyl chloride suitable in this connection are: air, carbon dioxide, nitrogen, sulphur hexafluoride, methyl or ethyl ether or the like. The gas must of course be soluble in the base substance to a suitable extent, and furthermore the pressure, during the melting procedure, must be chosen so as to enable the substance to absorb the gas. It may sometimes be preferred to press or stir a gas into the melted substance, for instance a heavy gas with low heat conductivity, such as sulphur hexafluoride, ethyl bromide, methyl iodide etc. If a gas of this kind is introduced in this way in a base substance in which it is not soluble the gas will remain in the pores or cells and aid in increasing the insulating capacity of the material.

What we claim is:—

1. Heat insulation consisting of a low-specific-gravity and highly-vesiculated mass of polystyrol substantially composed of closed cells.

2. Heat insulation consisting of a low-specific-gravity and highly-vesiculated mass of polystyrol substantially composed of closed cells and a substance intimately intermixed therewith for stiffening said mass.

3. Heat insulation consisting of a highly cellular mass of polystyrol and a metal powder intimately intermixed therewith.

4. Heat insulation consisting of a highly cellular mass of polystyrol, substantially composed of closed cells and having a specific gravity which is 0.1 or less.

5. Heat insulation consisting of a highly cellular mass of polystyrol the specific gravity of which is on the order of 0.04.

6. Heat insulation consisting of a low-specific-gravity and highly-vesiculated mass of polystyrol substantially composed of closed cells the walls of which are so thin as to be highly resistant to the conduction of heat.

7. Heat insulation consisting of a low-specific-gravity and highly-vesiculated mass of polystyrol substantially composed of closed cells the walls of which have a thickness on the order of 0.1 mm.

8. Heat insulation consisting of a highly cellular mass of polystyrol having a coating of nonporous material surrounding the porous inner parts of the insulation.

9. Heat insulation consisting of a highly cellular mass of polystyrol having heat reflecting surfaces on the walls of the cells.

10. Heat insulation consisting of a low-specific-gravity and highly-vesiculated mass of polystyrol substantially composed of closed cells which confine a gas of low heat conductivity.

11. Heat insulation consisting of a highly cellular mass of polystyrol having the walls of its cells including fibrous stiffening material and with heat reflecting surface coatings of a metal powder.

12. Heat insulation consisting of a low-specific-gravity and highly-vesiculated mass of polystyrol substantially composed of closed cells the walls of which contain a fibrous stiffening material and are so thin as to be highly resistant to the conduction of heat.

CARL GEORG MUNTERS.
JOHN GUDBRAND TANDBERG.